Figure 1:
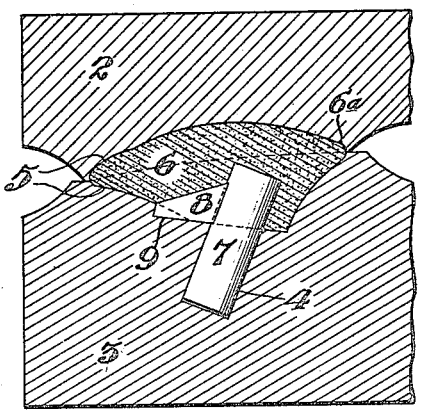

E. MOUNTFORD.
MOLD FOR MAKING ARTIFICIAL TEETH.
APPLICATION FILED NOV. 7, 1916.

1,224,490.   Patented May 1, 1917.

Inventor
Edwin Mountford

Witnesses
Daniel Webster Jr.
E. W. Smith

By
Attorney

UNITED STATES PATENT OFFICE.

EDWIN MOUNTFORD, OF YORK, PENNSYLVANIA, ASSIGNOR TO THE DENTISTS' SUPPLY COMPANY, A CORPORATION OF NEW YORK.

MOLD FOR MAKING ARTIFICIAL TEETH.

1,224,490. Specification of Letters Patent. Patented May 1, 1917.

Original application filed May 18, 1916, Serial No. 98,287. Divided and this application filed November 7, 1916. Serial No. 129,955.

*To all whom it may concern:*

Be it known that I, EDWIN MOUNTFORD, a citizen of the United States, and resident of York, county of York, and State of Pennsylvania, have invented an Improvement in Molds for Making Artificial Teeth, of which the following is a specification.

The object of my invention is to provide an improved mold for molding artificial teeth for carrying out the method set out in my application Ser. No. 98,287, filed May 18, 1916 (of which this application is a division), the particular feature of novelty in the mold being directed to the means for providing recessed portions in the back of the molded tooth, whereby the recessed portions are given certain shapes suitable for receiving the rubber of the plate for the purpose of making a strong union between the plate and tooth.

More particularly referring to the mold, it comprises two parts forming tooth spaces between them into which a preferably detachable upwardly extending stud is arranged and supported by that portion of the mold space forming the back of the tooth, said stud arranged obliquely to the floor of the tooth space, and the mold further provided with a lateral web extending upward above the same floor and extending into the tooth space, but preferably not as high thereinto as the stud, so that when the bisque material is molded it will inclose those portions of the stud and web which project into the tooth space, and in this manner ultimately provide in the back of the tooth an oblique hole or aperture having a slotted secondary aperture extending from the oblique hole upward on the back of the tooth, all of which is more fully disclosed hereinafter. In practice, it is preferable that the stud shall be detachable from the mold part so that when the bisque has been molded and then dried out by a moderate temperature, the mold may be opened and the lower part inverted to shake out the tooth with its attached stud, after which the said stud is removed, leaving the suitable recesses in the back of the tooth. The tooth so formed may then be burned to vitrify the bisque; but preferably, further treatment is given to the bisque before being burned or vitrified to insure a firmer hold upon the rubber plate, said additional treatment being to provide transverse holes and an undercut portion in the recess, but these additional features are provided by separate operations other than those due to the mold itself.

My invention also comprehends details of construction which, together with the features above specified, will be better understood by reference to the drawings, in which:—

Figure 4:
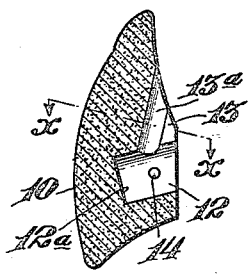
Figure 5:
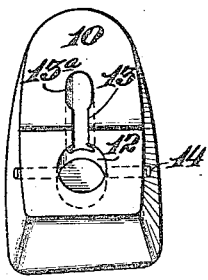
Figure 2:
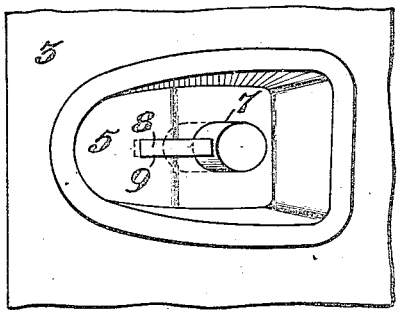
Figure 7:
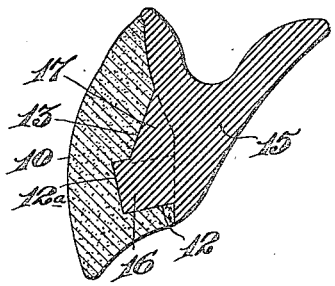
Figure 3:
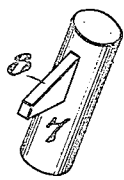
Figure 6:
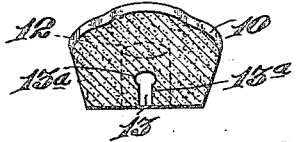

Figure 1 is a cross section of a portion of a mold embodying my improvements; Fig. 2 is a plan view of a part of the lower mold portion showing the web and the detachable stud; Fig. 3 is a perspective view of a form of a stud and web which are jointly detachable from the lower mold portion; Fig. 4 is a sectional side view through the finished tooth in the manufacture of which my improved mold is employed; Fig. 5 is a rear view of the said tooth; Fig. 6 is a transverse section of the same on line $x$—$x$ of Fig. 4; and Fig. 7 is a sectional view showing the tooth attached to the rubber plate.

2 and 3 are two parts of the mold, said parts being recessed as at 5 to provide the tooth space 6. 7 is an oblique stud which is received in an obliquely arranged hole 4 in the floor or bed of the recessed portion of the lower part 3 of the mold, this hole being of a depth sufficient to hold the stud in such manner that it shall project obliquely into the tooth space 6 in a direction toward the portion 6ª which would mold the incisor edge of the tooth. The mold part 3 is further provided with a more or less triangular shaped wing or web 8 extending upward into the tooth space and acting with the stud to mold a hole with a lateral recess or slotted portion in the bisque tooth. This web 8 may be rigid with the mold and project upwardly from its floor, and the stud is preferably removable as hereinbefore described, but if desired it also may be made fixed in the mold part. These parts 7 and 8 may, however, if desired, be both removable and made integral as indicated in Fig. 3, so that not only the stud, but the web, may be detached with the tooth and subsequently separated before burning. The web 8 is narrower than the diameter of the stud, as will be clearly understood by reference to Figs. 2 and 3, and preferably this web is more or less triangular in shape, its lower edge fitting tightly upon the bed of the tooth space at 9, integral or otherwise as the case may be. Not only is the stud 7 oblique or inclined toward the incisor edge of the tooth, but the inclination of the web 8 is also oblique for the purpose which will be hereinafter more fully set forth.

Referring now to the use of the mold:—With the two parts 2 and 3 of the mold assembled as indicated in Fig. 1, the bisque material in the tooth space 6 will be molded about the stud 7 and web 8, and when baked the tooth may be shaken from the mold with the stud portion attached, the weight of the metal stud assisting in shaking the bisque tooth out of the lower portion 3 of the mold when inverted. When the stud 7 is withdrawn from the bisque tooth, there will be left in the back thereof a diagonally directed cylindrical hole 12 (Figs. 4 and 5), and an upwardly directed recess or slot 13, said cylindrical recess and slotted recess corresponding to the shape of the parts 7 and 8 of the mold. If the web is made removable with the stud, then it, together with the stud, will be removed from the bisque tooth after taken from the mold. It is also to be understood that both the pin and the web may be fast in the mold and in that case the bisque tooth would be shaken therefrom. I do not restrict myself as to the removability of any or all of these parts.

After the tooth has been molded as above described, before it is burned or vitrified, the lateral holes 14 are drilled through its sides into the cylindrical aperture, and likewise the slotted recess 13 preferably has its side walls laterally grooved as at 13ª to provide undercut sides or shouldered portions with which the rubber of the plate will interlock. When the tooth has been finished and vitrified, it may be secured to a rubber plate 15 as indicated in Fig. 7, the rubber extending into the cylindrical aperture 12, as indicated at 16 (Fig. 7), and resting against the bottom of said aperture at 12ª. The portion 17 of the rubber fills the slotted recess 13. In this manner the rubber plate forms a strong union with the tooth.

In the drawing I have simply illustrated the mold portions for molding one tooth, but it is well known that the molds for making artificial teeth are arranged for making full sets of teeth at one operation, there being a plurality of such tooth recesses. It is sufficient, however, to illustrate the nature of one of these recesses.

While I have, by way of example, shown certain specific forms of the recesses and of the shape of the tooth, it will be manifest that all of these may be somewhat varied to suit the special requirements or wishes of the designer.

While I have described the construction of my improved mold in the preferred form which I have found most suitable for commercial use, nevertheless I do not restrict myself to the minor details of the structure, as these may be reasonably varied within the spirit of the invention.

In this application no claim is made for the method or for the tooth, as these form subject matter of my application Ser. No. 98,287, filed May 18, 1916 (of which this application is a division).

Having now described my invention, what I claim as new and desire to secure by Letters Patent, is:—

1. A mold for making artificial teeth, consisting of a plurality of mold parts shaped to provide a tooth space having a bed portion and an incisor portion, combined with an inclined stud extending from the bed portion into the tooth space in a direction toward the incisor end thereof, and a web portion also extending from the bed into the tooth space and having greatest height at its end next to the stud, said stud arranged between the web and the incisor end of the mold space.

2. A mold for making artificial teeth, consisting of a plurality of mold parts shaped to provide a tooth space having a bed portion and an incisor portion, and provided with an inclined stud extending from the bed portion obliquely into the tooth space in a direction toward the incisor end thereof, and said mold also having a web extending from the bed into the tooth space on the side of the stud most distant from the incisor portion said web of less height at one end than at the other and said stud arranged next to the end of the web having the greater height and projecting slightly above it into the tooth space.

3. A mold for making artificial teeth, comprising a two-part mold forming a tooth space and one of the parts having a hole and a projecting web to one side of the hole and extending into the tooth space, combined with a detachable stud fitting the hole and also extending obliquely into the tooth space and fitting snugly to the web, said web of less thickness than the stud.

4. A mold for making artificial teeth, consisting of a plurality of mold parts shaped to provide a tooth space having a bed portion corresponding to the back of the tooth and an incisor portion, said bed provided with a web extending into the tooth space and of greater height at its end next to the incisor portion than at its other end, and also having a hole in the bed between the web and the incisor portion, combined with a detachable stud fitting the hole and extending obliquely into the tooth space and in close relation with the end of the web said web being of less thickness than the stud.

In testimony of which invention, I hereunto set my hand.

EDWIN MOUNTFORD.

Witnesses:
G. H. WHITELEY, Jr.,
JAS. D. FINLEY.